Patented Aug. 14, 1951

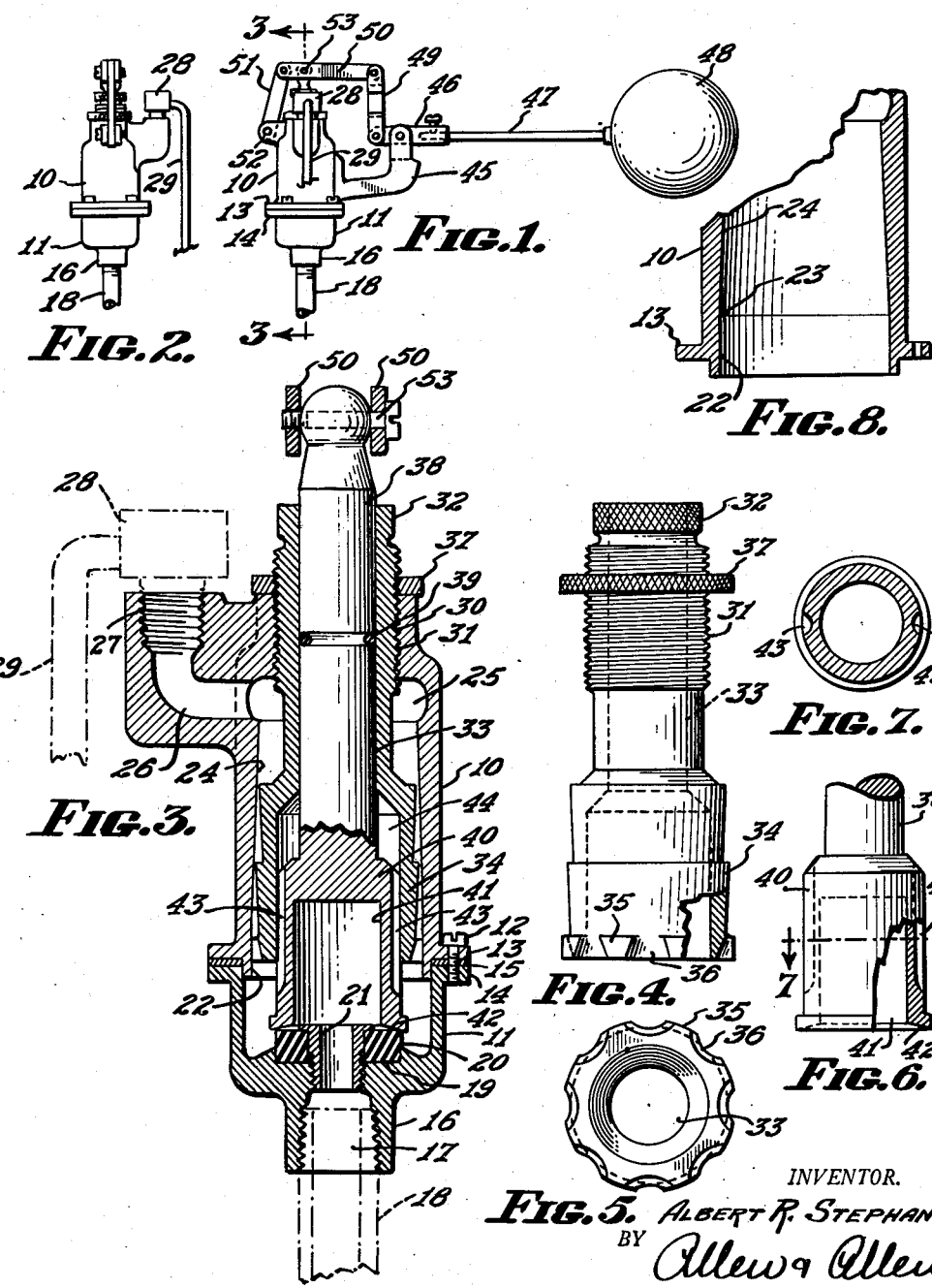
Aug. 14, 1951 — A. R. STEPHANY — 2,564,286
SILENT VALVE WITH PRESSURE REGULATOR
Filed April 9, 1948
INVENTOR.
Albert R. Stephany.
BY Allen & Allen
ATTORNEYS.

2,564,286

UNITED STATES PATENT OFFICE 2,564,286

SILENT VALVE WITH PRESSURE REGULATOR

Albert R. Stephany, Newport, Ky.

Application April 9, 1948, Serial No. 20,053

16 Claims. (Cl. 137—69)

This invention relates to a silent valve with pressure regulator. In my co-pending applications Serial No. 646,004, filed February 7, 1946, and entitled Silent Valve, now abandoned, and Serial No. 719,989, filed January 3, 1947, and entitled "Improved Silent Valve," I have disclosed and claimed valves which, although capable of a variety of uses, are more particularly adapted for use in connection with water closets.

In the usual water closet there is generally provided a tank or reservoir containing a supply of water for flushing the bowl. A water supply line leads into the reservoir and is provided with a float actuated valve having an actuating arm carrying a float which serves to shut off the valve when the water level reaches a predetermined height.

It has for many years been an object of research development in this art to provide a water closet which would be completely silent in operation. While considerable progress has been made along these lines, particularly insofar as the design of the bowl is concerned, trouble has always been encountered with the valve.

In my copending applications above referred to I have disclosed and claimed valve constructions which in most instances are silent. In those cases where the valves of my prior inventions are not completely silent, the reason for noise has been found to be a greatly different water pressure from that for which the valves were designed.

It is therefore an object of my present invention to provide a valve embodying certain of the principles set forth in my said copending applications, but incorporating additionally a pressure regulator so that the valve may be adjusted at the time of installation to a point of absolute silence.

Further objects of my invention include the provision of such a valve which would be relatively simple and inexpensive and which will have long wear, and thus low maintenance cost.

These and other objects of my invention which will be pointed out more in detail hereinafter, or which I shall set forth in more detail as the description proceeds, I accomplish by that certain construction and arrangement of parts of which I shall now describe an exemplary embodiment. Reference is made to the drawings forming a part hereof and in which:

Figure 1 is a small scale elevational view of the complete valve together with the float mechanism.

Figure 2 is an end elevation of the same as seen from the left of Figure 1.

Figure 3 is a cross-sectional view on a greatly enlarged scale taken on the line 3—3 of Figure 1.

Figure 4 is a detailed elevational view of the regulator member.

Figure 5 is an end elevation of the same as seen from the bottom of Figure 4.

Figure 6 is a detailed elevational view, with parts broken away, of the lower end of the valve member.

Figure 7 is a cross-sectional view taken on the line 7—7 of Figure 6, and

Figure 8 is a fragmentary cross-sectional view of the lower end of the upper casing member.

Briefly in the practice of my invention I provide a valve having a generally tubular casing and having an inlet opening in the bottom end thereof. The upper end of the casing has a threaded opening through which a hollow regulator member passes. The valve itself passes through the regulator member and has a bell-like lower end arranged to seat on an annular valve seat surrounding said inlet opening. The regulator member itself has a bell-like lower end embracing the bell-like lower end of the valve member. Since the regulator member has threaded engagement with the housing it may be adjusted as required and then fixed in position by means of a lock-nut.

Referring now more in detail to the figures, and particularly to Figure 3, the casing comprises two parts indicated generally at 10 and 11. These parts are suitably secured together as indicated at 12 through meeting flanges 13, 14, preferably with a gasket member 15 engaged between the flanges. The boss or extension 16 at the lower end of the casing is provided with an entrance opening 17 internally threaded to receive a pipe connection, as indicated in broken lines at 18. A seat is provided at 19 for a valve seat washer 20, which is preferably an annular piece of neoprene, or the like. The member 20 is secured in place by means of the hollow flange bushing member 21, as clearly shown in Figure 3.

The interior of the upper casing member 10 has a cylindrical bore 22 for a portion of its length and from the point indicated in Figure 8 at 23 the inner walls are slightly conical as indicated at 24. The taper of the interior walls at 24 with respect to the axis of the casing is from 1° to 2°, and preferably about 1½°. Adjacent the upper end of the casing member 10 is an annular chamber 25 communicating with an outlet passage 26 having a threaded opening at 27 for attachment to a non-siphoning attachment or the like indicated in broken lines at 28, and delivery pipe 29.

Axially of the casing member 10 the upper end thereof is bored and internally threaded as indicated at 30 to receive and cooperate with the threaded portion 31 on the shank of the regulator member.

The regulator member is shown best in Figures 4 and 5, and it comprises a generally tubular body having the threaded portion 31 mentioned above, and preferably terminating in a knurled knob 32. The regulator member is bored as at 33 and its lower end is formed to a bell-like configuration indicated generally at 34. Hereinafter and in the claims this portion will be generally referred to as the regulator bell. Externally at its lower end the regulator bell has a scolloped configuration best seen in Figure 5, and comprising a series of lands 35 and grooves 36. The lands 35 are of such diameter as to engage smoothly the cylindrical inner surface 22 of the casing member 10, while the grooves 36 permit passage of water to the regulator element. The regulator element proper comprises the exterior of the bell member 34, which, as seen in Figure 4, comprises two steps having tapered outer walls. The taper of these walls is also between 1° and 2° and preferably about 1½° with relation to the axis of the valve and extends in the opposite direction to the taper of the walls 24 of the casing member 10. When the regulator member is assembled to the casing as seen in Figure 3, it will be understood that by turning the member 32 the regulator bell is caused to move upward or downward within the casing with the lands 35 engaging the cylindrical wall 22. It will be understood that as the bell member 34 is raised within the casing the annular passage for water will become more and more restricted, and as the member 34 is lowered within the casing these annular passages become more and more open. The position of the regulator member in the casing may be fixed by means of the lock nut 37 as will be clear.

The valve member itself comprises the stem portion 38 provided with conventional sealing means as at 39, and having at its lower end a bell-like member, which hereinafter will be referred to as the valve bell, indicated generally at 40. The valve bell 40 is hollow as indicated at 41, and is provided with the conical rim 42 for engagement with the valve seat washer 20. The surface 42 should be less than 20° and greater than 10½° with respect to the horizontal, so that the surface 42 engages the washer 20 by line contact. I have determined that if the angle of the rim portion 42 is less than 20° there is substantially no wear upon the corner of the washer 20, and that in order for the valve to be silent the angle must be at least 10½°.

The valve bell 40 has sliding engagement on the inside of the regulator bell, but in order to equalize pressure on both sides of the bell the latter is grooved as indicated at 43, so as to permit water to enter into the area 44 behind the valve bell and within the regulator bell.

The casing is formed with a bracket 45 to which is pivoted an arm 46 provided with a hole and setscrew to carry the float arm 47 on the end of which is secured the ball float 48. The opposite end of the link 46 has pivoted to it a link 49 which is pivoted to the operating link 50, which in turn is pivoted to the link 51, which is pivoted to a bracket 52 on the casing. The link 50 intermediate its ends is pivoted as by the pin 53 to the end of the valve stem member 38. It will now be clear that when the level in the reservoir drops, causing the ball float 48 to drop, the linkage will operate to raise the valve member within the casing, whereby the valve is opened. As the water in the reservoir rises causing the ball float 48 to rise, the valve is gradually lowered until it seats as heretofore described. The chamber 41 in the valve bell serves as a silencing chamber as was the case with the valves of my copending applications, and, as before, the entire valve including the chamber 25, the passage 26 and the pipe 29 are at all times filled with water. Thus, when the valve is open the beginning of movement of the water is unattended by the impingement of a stream of water against a stationary surface and therefore no noise is produced, and by virtue of the construction the valve may be adjusted to the point where in closing it will be impossible to detect any sound.

It will be clear that modifications may be made without departing from the spirit of my invention, and I therefore do not intend to limit myself except insofar as set forth in the claims which follow.

Having now fully described my invention, what I claim and desire to secure by Letters Patent is:

1. A valve comprising a casing having a fluid outlet, a fluid inlet in said casing, a valve seat member surrounding said inlet, a valve member comprising a bell having a rim for contacting said seat member, means for actuating said valve member from the exterior of said casing, and a regulator member in said casing for regulating the flow of fluid through said casing when said valve is open, said regulator member being adjustable from the exterior of said casing and comprising a bell embracing said valve bell, and having on its exterior wall a stepped, tapered configuration, the interior of said casing having a tapered configuration opposite to the taper of said bell, whereby by axial adjustment of said regulator bell relative to said casing, the fluid passageway between said regulator bell and said casing is adjusted, to regulate the flow of fluid through said casing.

2. A device according to claim 1, in which the degree of taper of said exterior bell wall steps and of the interior casing wall, each with respect to the axis of said valve, is between substantially 1° and substantially 2°.

3. A device according to claim 2, in which said exterior bell wall has two steps.

4. A device according to claim 3, in which the rim of said valve is chamfered to an angle of substantially 10½°.

5. A device according to claim 4, in which the outer face of said valve bell is provided with grooves for pressure equalization.

6. A valve comprising a casing having a fluid outlet, a fluid inlet in said casing, a valve seat member surrounding said inlet, a regulator member comprising a shank and a bell, an opening in said casing, said shank having threaded engagement with said opening whereby the position of said bell may be adjusted in relation to said casing, said shank being hollow, and a valve member having a bell and a shank, said valve shank having sliding motion in said regulator shank and said valve bell having sliding motion in said regulator bell, said valve bell having a rim to seat against said seat member to close said valve, said regulator bell having on its exterior wall a stepped, tapered configuration, and the interior of said casing having a tapered configuration opposite to the taper of said bell, whereby, by axial adjustment of said regulator bell relative to said casing, the fluid passageway between said regulator bell and said casing is adjusted, to regulate the flow of fluid through said casing.

7. A device according to claim 6, in which the degree of taper of said exterior bell wall steps, and of the interior casing wall, each with respect to the axis of said valve, is between substantially 1° and substantially 2°.

8. A device according to claim 7, in which said exterior bell wall has two steps.

9. A device according to claim 8, in which the rim of said valve bell is chamfered to an angle of substantially 10½°.

10. A device according to claim 9, in which the outer face of said valve bell is provided with grooves for pressure equalization.

11. A device according to claim 1 in which the rim of said valve bell is chamfered to an angle of substantially 10½°.

12. A device according to claim 6, in which the rim of said valve bell is chamfered to an angle of substantially 10½°.

13. A valve comprising a generally tubular casing having an entrance opening in one end and an exit opening adjacent the other end, a threaded bore in said casing in the end opposite said entrance opening, a regulator member having an externally threaded hollow shank and a regulator bell, said threaded shank engaging in said threaded bore for adjustment of said regulator, a valve member having a shank portion slidable in the hollow shank of said regulator member and having a valve bell disposed within said regulator bell, said bell having a rim, said entrance opening having an annular valve seat for engagement by the rim of said valve bell, and said valve bell having sliding bearing within said regulator bell and having grooves in its outer face for pressure equalization behind said valve bell and within said regulator bell, said regulator bell having on its exterior wall a stepped and tapered configuration and the interior of said casing having an oppositely tapered configuration, whereby, by axial adjustment of said regulator bell relative to said casing, the fluid passageway between said regulator bell and said casing is adjusted, to regulate the flow of fluid through said casing.

14. A device according to claim 13, in which the degree of taper of said exterior regulator bell wall steps and of the interior casing wall each with respect to the axis of said valve, is between substantially 1° and substantially 2°.

15. A device according to claim 14, in which said exterior bell wall has two steps.

16. A device according to claim 15, in which the rim of said valve bell is chamfered to an angle of substantially 10½°.

ALBERT R. STEPHANY.

REFERENCES CITED

The following references are of record in the file of this patent:

UNITED STATES PATENTS

| Number | Name | Date |
|---|---|---|
| 893,884 | Sturgis | July 21, 1908 |
| 1,981,904 | Clemmons | Nov. 27, 1934 |
| 2,164,927 | Kohler | July 4, 1939 |
| 2,229,601 | Bark | Jan. 21, 1941 |

FOREIGN PATENTS

| Number | Country | Date |
|---|---|---|
| 629 | Great Britain | Jan. 10, 1899 |